(12) United States Patent
Krietzman

(10) Patent No.: US 6,431,731 B1
(45) Date of Patent: Aug. 13, 2002

(54) LASER DEVICE AND METHOD FOR PRODUCING DIFFUSE ILLUMINATION

(76) Inventor: Mark Howard Krietzman, P.O. Box 3185, Palos Verdes, CA (US) 90274

( * ) Notice: Subject to any disclaimer, the term of this patent is extended or adjusted under 35 U.S.C. 154(b) by 0 days.

(21) Appl. No.: 09/525,533

(22) Filed: Mar. 14, 2000

Related U.S. Application Data

(60) Provisional application No. 60/124,423, filed on Mar. 15, 1999.

(51) Int. Cl.[7] .................................................. F21K 7/00
(52) U.S. Cl. ....................... 362/259; 362/231; 362/246; 359/28; 359/599
(58) Field of Search ................................. 362/227, 234, 362/231, 235, 236, 245, 259, 19, 558, 561; 345/7, 9, 32; 353/13, 30, 31, 46

(56) References Cited

U.S. PATENT DOCUMENTS

| | | | |
|---|---|---|---|
| 3,407,294 A | 10/1968 | Hill ............................ 362/259 |
| 5,685,636 A | 11/1997 | German ....................... 362/259 |
| 5,978,148 A | * 11/1999 | Oono et al. .................. 359/668 |
| 5,990,983 A | * 11/1999 | Hargis et al. ................ 348/758 |
| 6,002,505 A | * 12/1999 | Kraenert et al. ............. 359/196 |
| 6,007,218 A | 12/1999 | German et al. .............. 362/259 |
| 6,018,408 A | * 1/2000 | Hong .......................... 359/201 |
| 6,137,461 A | * 10/2000 | Deter et al. .................... 345/84 |
| 6,142,650 A | 11/2000 | Brown et al. ................ 362/259 |
| 6,183,092 B1 | * 2/2001 | Troyer .......................... 353/31 |
| 6,190,022 B1 | 2/2001 | Tocci et al. .................. 362/259 |
| 6,222,459 B1 | * 4/2001 | Ting ......................... 340/815.4 |
| 6,233,089 B1 | * 5/2001 | Nebel .......................... 359/330 |

* cited by examiner

Primary Examiner—Sandra O'Shea
Assistant Examiner—Ismael Negron
(74) Attorney, Agent, or Firm—Mark Krietzman

(57) ABSTRACT

A laser device which directs one or more wavelengths of pulsed diffuse laser light at a target to produce a diffuse laser illumination, and a method of illuminating and viewing a target with the reflection from one or more wavelengths of diffuse laser light reflected off a target.

19 Claims, 5 Drawing Sheets

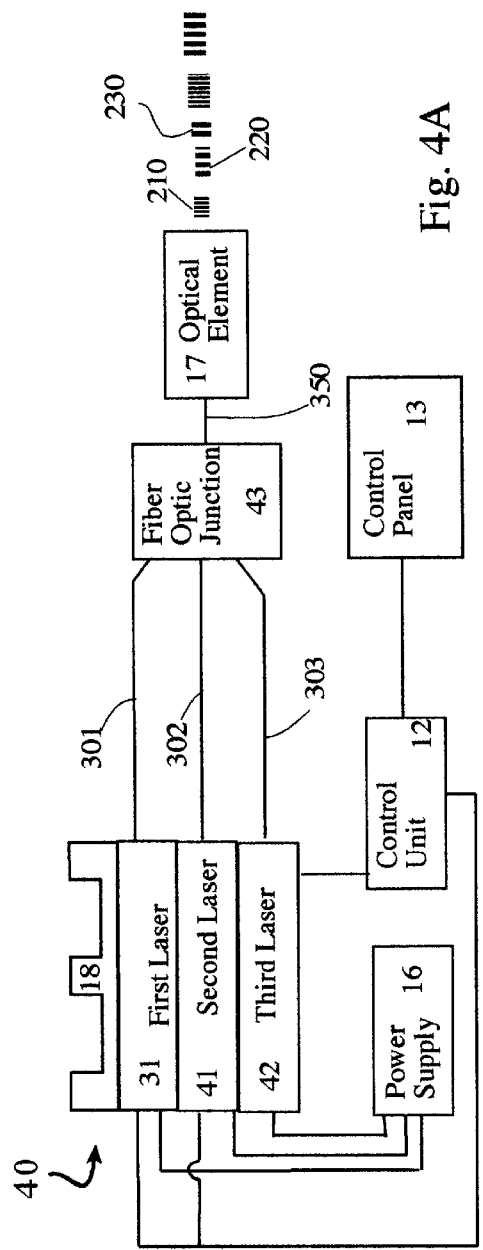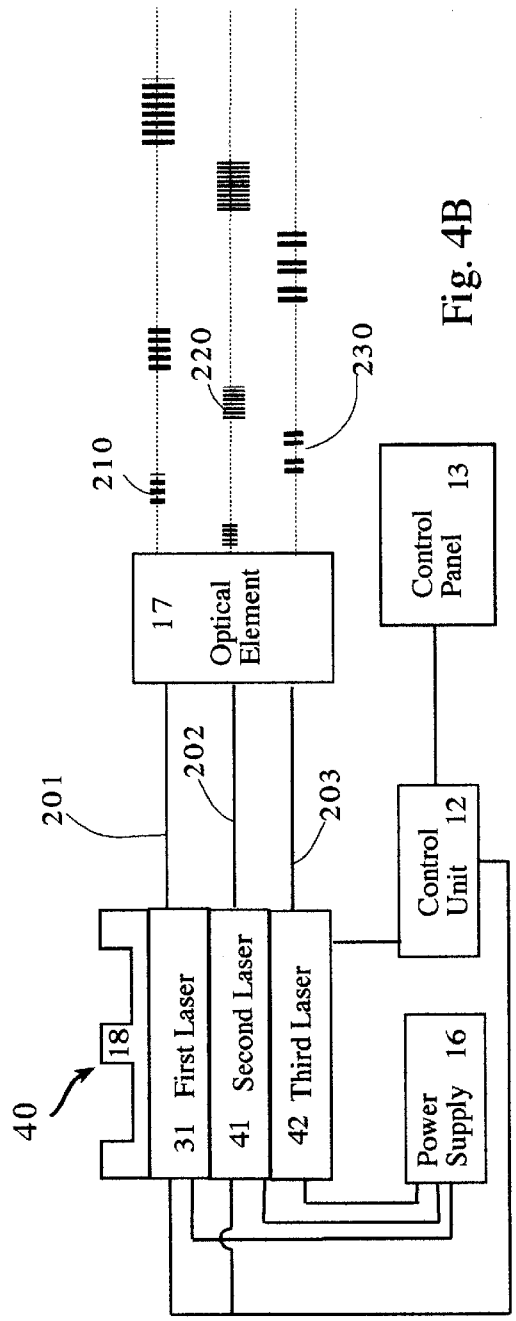
Fig. 4A
Fig. 4B

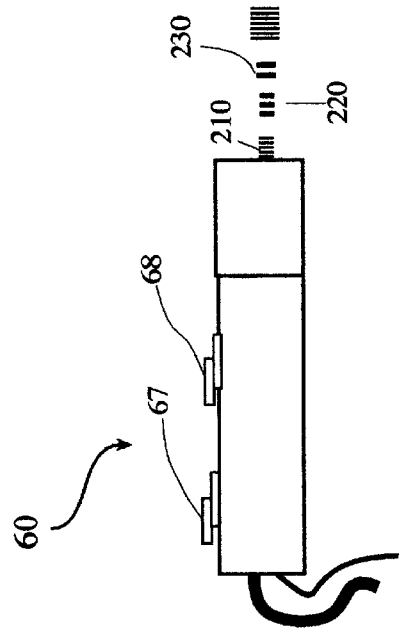
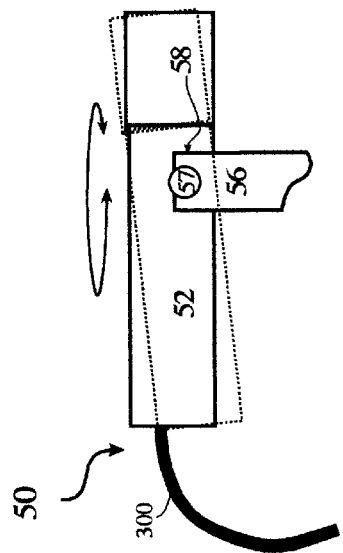
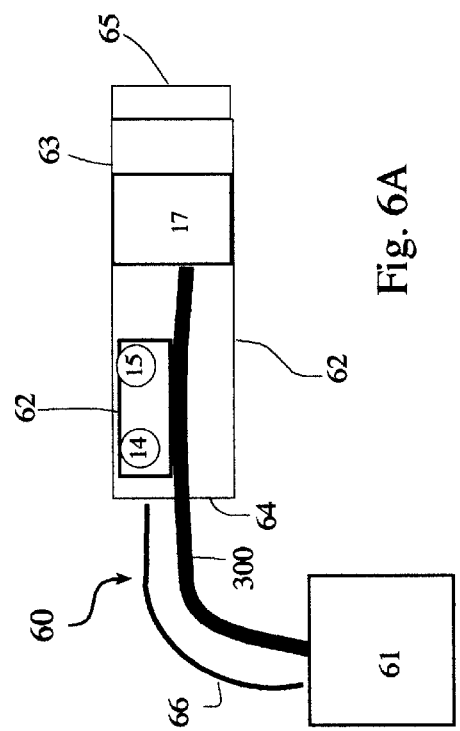
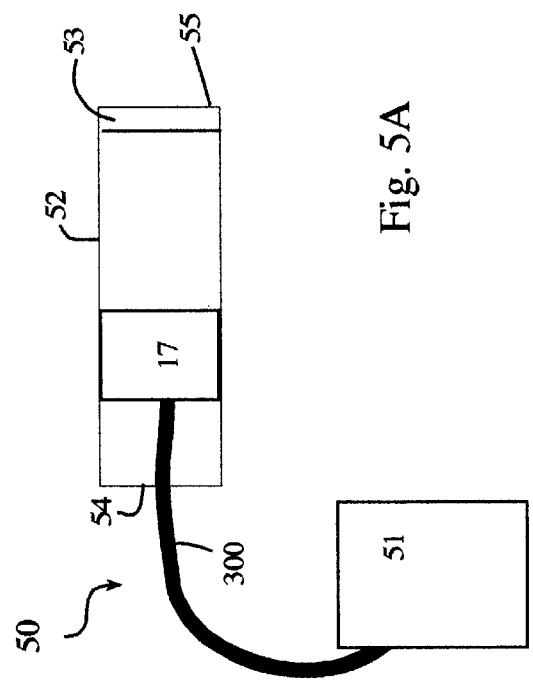
Fig. 5B
Fig. 6B
Fig. 5A
Fig. 6A

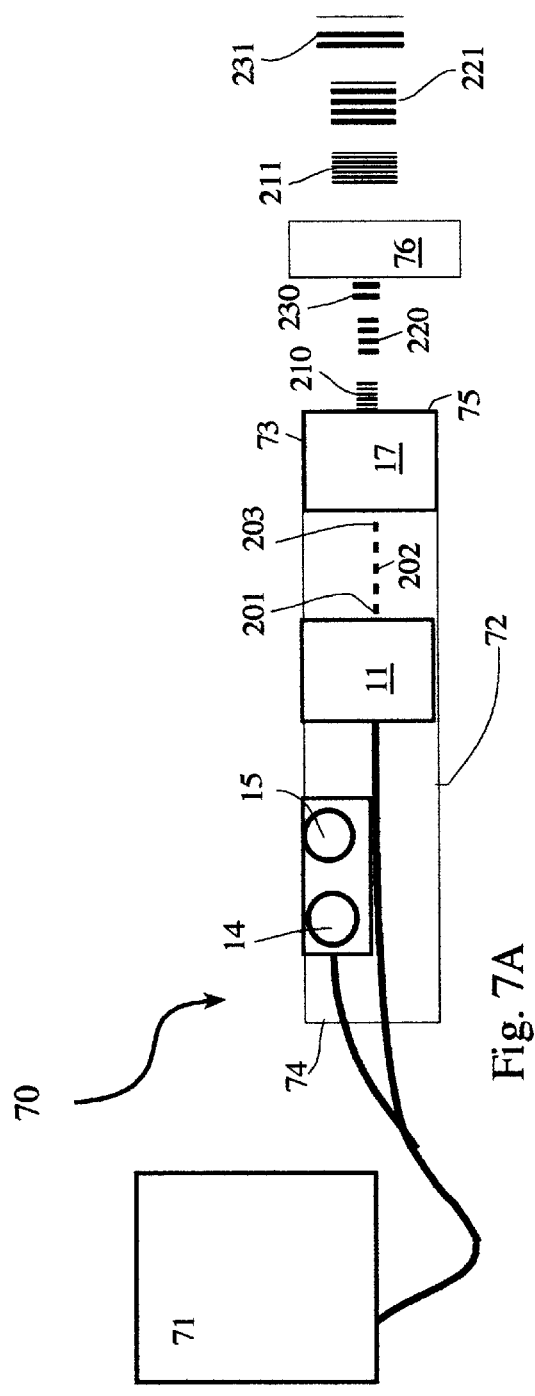
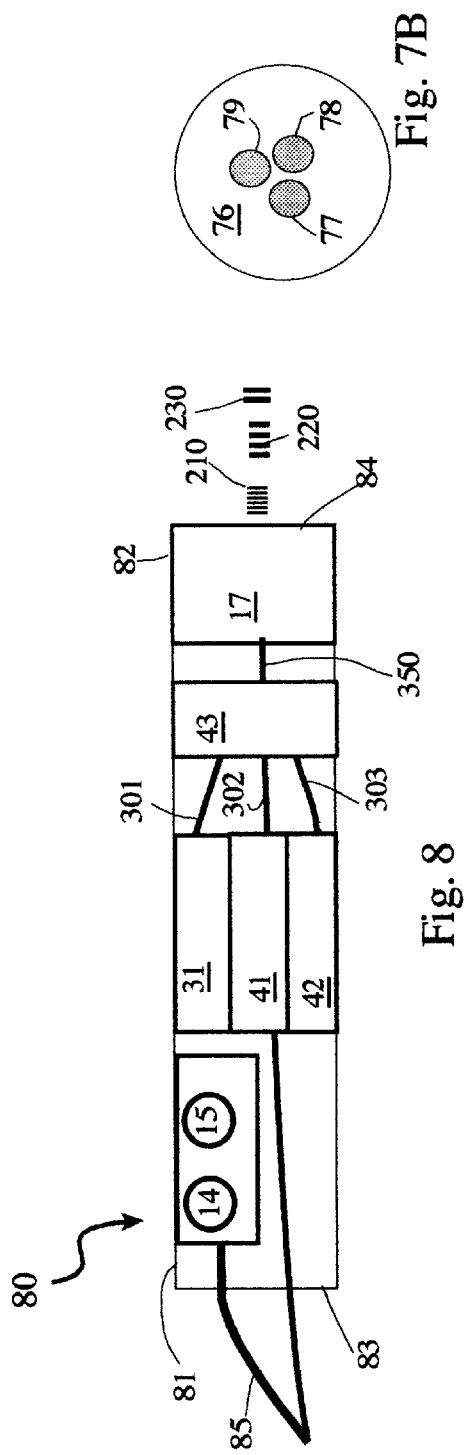
Fig. 7A
Fig. 7B
Fig. 8

LASER DEVICE AND METHOD FOR PRODUCING DIFFUSE ILLUMINATION

RELATED APPLICATIONS

The within invention is related to applicants' patents entitled Laser Pointer With Light Shaping Rotating Disk 6,000,813, Secondary Power Supply For Use With Handheld Illumination Devices 5,909,602, and Laser Light 6,062,270,2. The invention also claims the benefit, under Title 35, United States Code 119 (e), of Provisional Application No. 60/124,423, filed Mar. 15, 1999, entitled White Laser.

BACKGROUND OF THE INVENTION

1. Field Of The Invention

This present invention relates to a novel method and laser system for producing a laser spot light illumination. It also relates to a mehtod and system to produce a wide spectrum laser illumination which blends two or more distinct wavelengths of coherent light at a target providing the benefit of both long distance coherency and the clarity of broad spectrum illumination.

2. Background

Applicants' U.S. Pat. Nos. 5,909,602, and 6,062,702 teach the use of a diffuse laser source as an illumination device. Applicants' patents teach the use of diffusion technology to construct a laser illumination device which uses a high power laser emiming source and diffuses the output to a level which may place the device within the F.D.A. safety guidelines for a consumer laser device. The within invention builds on applicant's foundational technologies which use single and multiple coherent sources for use as an illumination spot light.

He-Cd, Krypton, Argon, Nd:YAG, Nd:YVO, Nd:YLF, Diode-pumped, CW diode, Q-switched diode, solid-state, solid-state CW, solid-state Q-switched, gas, dye, organic, ion, or rare-earth element laser are also well known in the art; some of which when combined with OPO non-linear crystal, dichroic beam splitters and SHG (second harmonic generating crystals) provide suitable laser emitting sources for the device and method within.

For illumination, the sequential overlay of distinct Wavelengths of light, above the threshold of visual acuity, provide the whitish light or broad spectrum laser spot. The sequential overlay of distinct coherent emissions from one or more laser sources is taught in applicant's U.S. Pat. No. 6,000,813.

The use of a diffuse strobbing laser output is discussed in applicant's U.S. Pat. No. 6,000,813 and by Brown in the U.S. Pat. No. 5,997,163. Both the single source strobbing laser and the sequentially strobbed multiple wavelength laser output devices are effective for this use.

Moreover, the strobbing of any of the within devices above the threshold of visual acuity provides apparent continuous illumination while reducing the risk of eye-damage and reducing the energy consumption of the laser.

SUMMARY OF INVENTION

Accordingly, it is an object of the invention to provide a novel method for producing a coherent wide spectrum illumination.

It is yet another object of the invention to provide a novel method for producing a shape selectable coherent diffuse illumination.

It is yet another object of the invention to provide a novel method for producing a diffuse laser spot light.

It is yet another object of the invention to provide a novel laser emitting device for producing a diffuse laser spot light.

It is yet another object of the invention to provide a novel laser emitting device for transmitting a coherent diffuse illumination to a target.

It is yet another object of the invention to provide a novel laser emitting device for sequentially overlaying, at a rate above the visual threshold, diffuse coherent light, which in-turn can reduce the risk of eye-damage and reduce power consumption.

It is yet another object of the invention to provide a novel laser emitting device for sequentially overlaying dissimilar wavelengths of coherent light to produce a diffuse illumination.

It is yet another object of the invention to provide a novel laser emitting device for sequentially overlaying, at a rate below the visual threshold, dissimilar wavelengths of coherent light to produce a diffuse strobing illumination.

It is yet another object of the invention to provide a novel laser emitting device for sequentially overlaying, at a rate above the visual threshold, dissimilar wavelengths of coherent light at a target, to produce a reflected diffuse illumination.

It is yet another object of the invention to provide a novel laser emitting device for producing diffuse red, green and blue coherent light directed at a target and creating a reflected mixed illumination.

It is yet another object of the invention to provide a novel laser emitting device for producing a reflected selectable mixed spectrum illumination.

It is yet another object of the invention to provide a novel handheld laser emitting device for producing a reflected wide spectrum illumination.

It is yet another object of the invention to provide a novel vehicle, ship, aircraft or helicopter mounted laser emitting device for producing a reflected diffuse illumination.

The features of the invention believed to be novel are set forth with particularity in the appended claims. The invention itself, however, both as to configuration, and method of operation, and the advantages thereof, may be best understood by reference to the following descriptions taken in conjunction with the accompanying drawings.

BRIEF DESCRIPTION OF THE DRAWINGS

FIG. 4A illustrates a schematic view of a fourth embodiment of a multi-wavelength laser illumination system.

FIG. 4B illustrates a schematic view of an alternate embodiment of the multi-wavelength laser illumination system of FIG. 4A.

FIG. 5A illustrates a first component view of the multi-wavelength laser illumination system.

FIG. 5B illustrates a partial side-view of the first component view of FIG. 5A.

FIG. 6A illustrates a second component view of the multi-wavelength laser illumination system.

FIG. 6B illustrates a partial side-view of FIG. 6A.

FIG. 7A illustrates a third component view of the multi-wavelength laser illumination system.

FIG. 7B illustrates a front view of the output selector ring of FIG. 7A.

FIG. 8 illustrates a fourth component view of the multi-wavelength laser illumination system.

MODES FOR CARRYING OUT THE INVENTION

Figure 1:
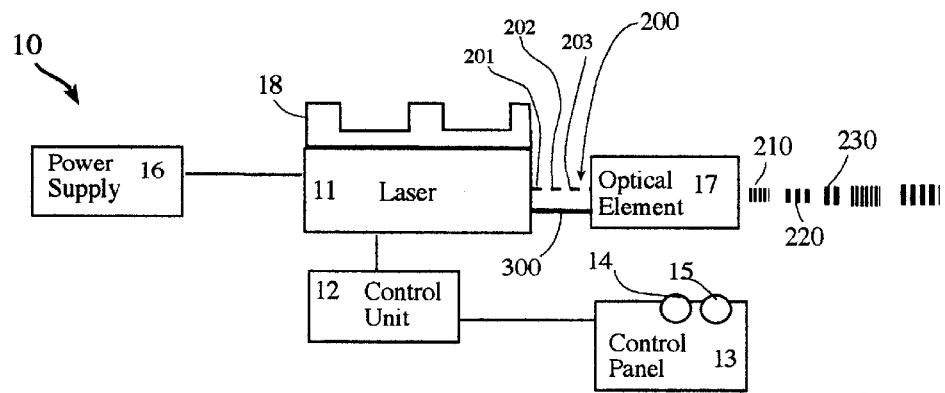
FIG. 1 illustrates a schematic view of the a first embodiment of a multi-wavelength laser illumination system.

Referring now to the drawings, there is illustrated in FIG. 1 a schematic of the multi-wavelength laser illuminator system generally designated 10, comprising a tunable laser emitting source 11, capable of emitting outputs of one or more controllably pulsed distinct wavelengths of coherent visible light 201,202,203, (such a laser emitting source is readily available and known art it is therefore unnecessary to present a detailed statement of its construction in the present invention), a control unit 12, a control panel 13 with switches 14 & 15, a power supply 16, and at least one optical element 17 for expanding or diffusing the coherent visible light output 201,202,203 produced by the laser emitting source 11.

In this preferred embodiment the intended optical element 17 is a light shaping diffuser with a pre-determined fan angle, however, it is envisioned that other know beam homogenizing, diffusing and/or expanding elements constructed of thin film, mirror, lens, and lens combinations may be used without departing from the intended scope of the invention.

Dependent on the laser emitting source 11, the power output, and portability of the multi-wavelength laser illuminator, a heatsink 18 for cooling may be required. Also depending on the intended usage, output, and portability a fiber-optic connection 300 to provide a flexible control pathway from the laser emitting source 11 to the optical element 17 may be added (see FIGS. 5A & 6A). Exiting the optical element are shown pulses of three distinct wavelengths of diffuse coherent visible light 210, 220, 230 corresponding to red (635–690 nm) green (510–550 nm) and blue (430–460 nm).

Switches 15 & 14 mounted on the control panel 13 allow for adjustment of the intensity of each coherent visible light output 201, 202, 203 by selectively controlling the duration and the pulse rate of each coherent visible light output 201, 202, 203. (Such control devices are readily in the present invention. Commonly used devices are chips with pulse generators, or embedded control chips containing built-in counters, CPU, I/O, RAM and ROM, such as Motorola part No. 6E8HC11).

Figure 2:
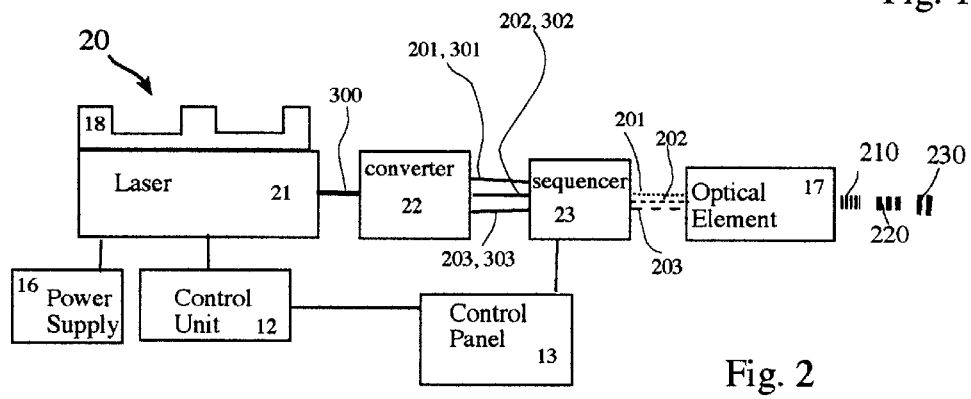
FIG. 2 illustrates a schematic view of a second embodiment of a multi-wavelength laser illumination system.

Referring now to FIG. 2 there is shown a schematic of a second embodiment of a multi-wavelength laser illumination system generally designated 20.

In this second embodiment an IR emitting laser such as a Nd:YAG 21 transmits an IR laser emission to a converter unit 22 which modulates the IR emission into three distinct wavelength of coherent visible light output 201, 202, 203 corresponding, to red (635–690 nm) green (510–550 nm) and blue (430–460 nm). To those familiar with laser conversion systems it is known that a fiber optic connection 300 is a common method to transport the IR emission from a laser to a converter unit. Three color conversions are also well known in the art therefore a detail description of the converter unit 22 construction is not necessary. Components of a three color converter may include one or more SHG crystal, OPO of non-linear crystal and dichroic beam splitters.

Exiting the converter unit 22 are three distinct wavelengths of coherent visible light output 201, 202, 203, which depending on the packaging for deployment of the multi-wavelength laser illumination system 20, a series of optical fibers 301, 302, 303 may be used to transport each of the three distinct wavelengths of coherent visible light output 201, 202, 203 to a sequencer 23. The sequencer, essentially a beam chopping device either reciprocating or rotating is used to control the pulse rate and emission sequence of each of the three distinct wavelengths of coherent visible light output 201, 202, 203.

The sequenced distinct wavelengths of coherent visible light output 201 202, 203 are then directed to at least one optical element 17 for expanding and/or diffusing the three distinct wavelengths of coherent visible light output 201, 202, 203 into the sequential pulses of three distinct wavelengths of diffuse coherent visible light 210, 220, 230.

The remainder of the system is a control unit 12 control panel 13 with switches 14 & 15 and a power supply 16. Dependent on the laser emitting source 21, the power output, and portability a heatsink 18 for cooling may be required.

Figure 3:
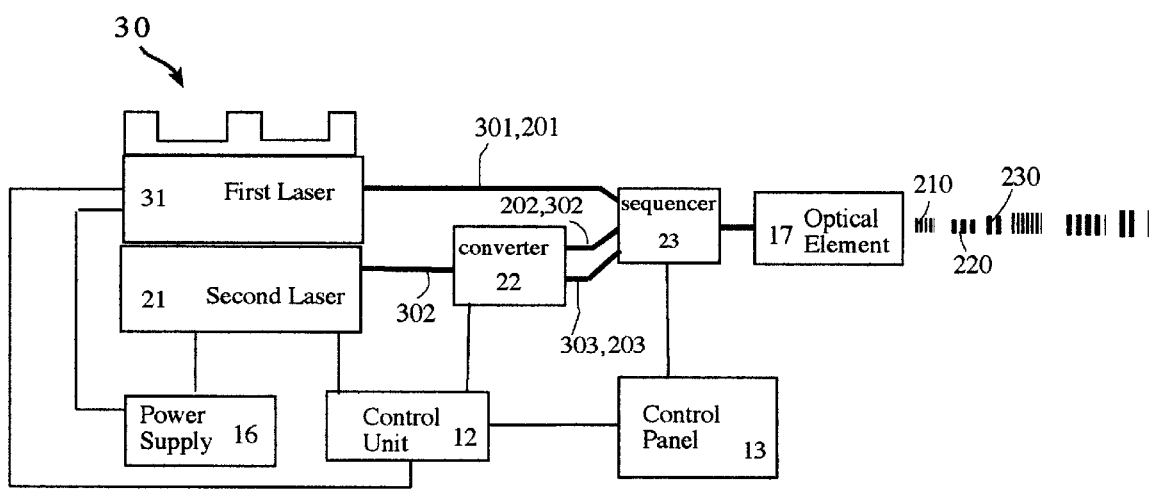
FIG. 3 illustrates a schematic view of a third embodiment of a multi-wavelength laser illumination system.

Referring now to FIG. 3 there is shown a schematic of a third embodiment of a multi-wavelength laser illumination system generally designated 30, In this third embodiment a first laser emitting source 31 of one visible wavelength corresponding to red (635–690 nm), green (510–550 nm) or blue (430–460 nm) is combined with an IR emitting laser. The IR emitting laser, such as a Nd:YAG 21, transmits an IR laser emission via an optical fiber 301 to a converter unit 22 which modulates the IR emission into two distinct wavelengths of coherent visible light output 202 and 203 corresponding to red (635–690 nm) and green (510–550 nm), or green (510–550 nm) and blue (430–460 nm), or blue (430–460 nm) and red (635–690 nm).

The coherent visible light output 201 from the first laser emitting source 31 and the coherent visible light outputs 202 & 203 from the converter unit 22, which may also be carried via the optical fibers 302, 303, converge at the sequencer 23, and as described in FIG. 2 the sequenced distinct wavelengths of coherent visible light output 201, 202, 203 are then directed to at least one optical element 17 for expanding and/or diffusing the three distinct wavelengths of coherent visible light output 201, 202, 203 into the sequential pulses of three distinct wavelengths of diffuse coherent visible light 210, 220, 230.

The remainder of the system is a control unit 12 ,control panel 13 with switches 14 & 15, and a power supply 16. Depending on the laser emitting source 21, the power output, and portability a heatsink 18 for cooling may be required.

Referring now to FIGS. 4A & 4B there are shown schematics of a fourth embodiment of a multi-wavelength laser illumination system generally designated 40.

In this fourth embodiment first, second and third pulsating laser emitting source 31, 41 & 42 are packaged together, each emitting one visible wavelength corresponding to red (635–690 nm), green (510–550 nm) or blue (430–460 nm). In FIG. 4A the laser emissions are transmitted through a series of optical fibers 301, 302, 303 to a fiber optic junction 43 and exit the fiber optic junction 43 dough a tertiary fiber optic cable 350 which is directed through at least one optical element 17. In FIG. 4B The distinct wavelength of coherent visible light output 201, 202, 203 without fiber optics, are directed towards at least one optical element 17.

The control unit 12 sequences the first, second and third pulsating laser emitting sources 31, 41 & 24 to preclude simultaneous emissions. The control panel's 13 switches 14 & 15 allow for adjustment of the intensity of each pulse of coherent visible light output 201, 202, 203 and the duration and the pulse rate of each coherent visible light output 201, 202, 203. A power supply 16 and a heatsink 18 form the remainder of the system.

Referring now to FIGS. 5A and 5B there is shown a first component view and a partial side-view of the multi-wavelength laser illumination system, generally designated 50.

A remote unit 51 which houses the laser, power supply, control unit and heatsink (depending on the size) is either mounted in a vehicle or carried as a backpack by the operator. The control panel 13 may be affixed directly to The remote unit 51 or movably connected, again dependant on the location of the remote unit 51. An illumination head casing 52 with an open front 53, a sealed rear 54 and a protective transparent lens cover 55 houses at least one optical element 17 for expanding and/or diffusing the three distinct wavelengths of coherent light. A fiber optic connection 300, which passes through the sealed rear 54 of the illumination head casing 52, connects the laser emitting source within the remote unit 51 to the illumination head casing 52. The illumination head casing 52, may be mounted in a stationary mount for use on a vehicle, airplane, ship or helicopter, via a mounting bracket 56. The illumination head casing 52, with two catches 57 formed on either side, mates wit two catches 58 formed as part of the mounting bracket 56.

Referring now to FIGS. 6A and 6B there is shown a second component view and a partial side-view of the multi-wavelength laser illumination system, generally designated 60.

A remote unit 61 which houses the first and second laser, a converter, a sequencer, a power supply, a control unit and a heatsink (depending on the size) is either mounted in a vehicle or carried as a backpack by the operator. An illumination head casing 62 with an open front 63, a sealed rear 64 and a protective transparent lens cover 65 houses at least one optical element 17 for expanding and/or diffusing the three distinct wavelengths of coherent light. A fiber optic connection 300 passes through the sealed rear 64 of the illumination head casing 62 and connects the laser emitting source, within the remote unit 61, to the illumination head casing 62. A wire harness 66 connects the control panel with the control unit 12 within the remote unit 61.

The illumination head casing 62 is easily hand held and output is adjusted via a series of switches 67 & 68 supported on the illumination head casing 62. The series of switches 67 & 68 connect to the control panel and allow for adjustment of the intensity of each distinct wavelength of diffuse coherent visible light 210, 220, 230.

Referring now to FIG. 7A there is shown a third component of the multi-wavelength laser illumination system, generally designated 70.

A remote unit 71 which houses the power supply and control unit is either mounted in a vehicle or carried as a backpack by the operator. An illumination head 72 casing with an open front 73, a sealed rear 74 and a protective transparent lens cover 75 mounted over the open front 73, houses at least one optical element 17 for expanding and/or diffusing the pulsed discreet wavelengths of coherent visible light output 201,202,203 into distinct wavelengths of diffuse coherent visible light 210, 220, 230. Also mounted within the illumination head 72 casing is the laser emitting source 11 capable of emitting controllably pulsed wavelengths of coherent visible light 201,202,203. A movable output selector ring 76 may be affixed over the protective transparent lens cover 75 whereby rotation of the output selector ring 76 aligns one or more additional beam expanding, light shaping or diffusion elements (shown in FIG. 7B) with the diffuse coherent visible light 210, 220, 230.

An illumination head casing 81 with an open front 82, a sealed rear 83 and a transparent lens cover 84 mated over the open front 82 houses a first, second and third pulsating laser emitting source 31, 41 & 42, each emitting one visible wavelength of coherent light corresponding to red (635–690 nm), green (510–550 nm) or blue (430–460 nm). A series of optical fibers 301, 302, 303 which merge at a fiber optic junction 43 exit the fiber optic junction 43 through a tertiary fiber optic cable directs the distinct wavelengths of coherent visible light 201,202,203 through at least one optical element 17 and the diffuse coherent visible light 210, 220, 230 depart the device therethrough.

Referring now to FIG. 7B there is shown a front view of the output selector ring of FIG. 7A, generally designated 76

Affixed to the face of the output selector ring 76 is a clear window 77 and a series of beam expanding, light shaping an/or diffusion elements 78,79. Rotation of the output selector ring 76 aligns the diffuse coherent light 210, 220, 230 exiting the multi-wavelength laser illumination system 70 with the clear window 77 or a beam expanding, light shaping or diffusion element 78,79.

Referring now to FIG. 8 there is shown a a fourth component view of the multi-wavelength laser illumination system, generally designated 80.

A flexible wire harness 85 connects the illumination head casing and its components with a remote power source and control unit (not shown).

Figure 9:
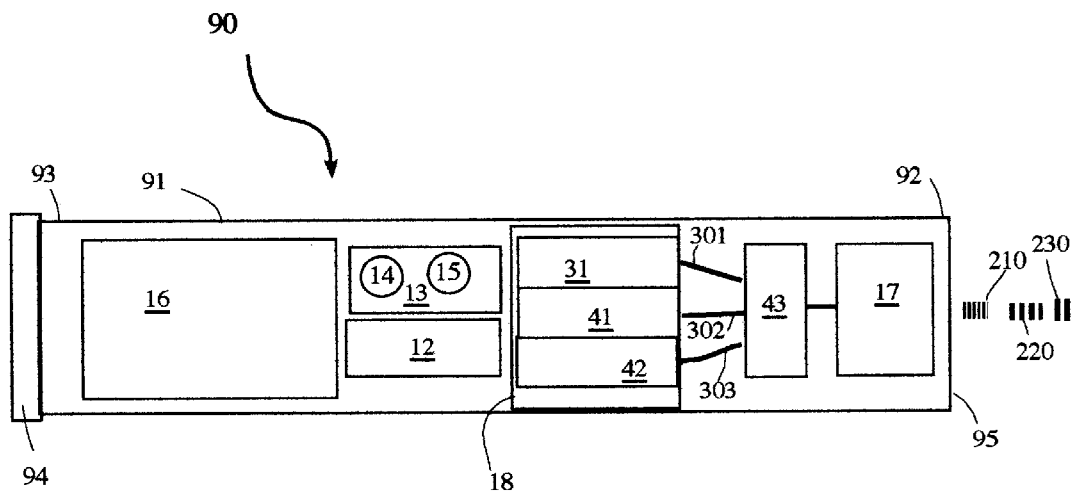
FIG. 9 illustrates a fifth component view of the multi-wavelength laser illumination system.

Referring now to FIG. 9 there is shown a a fifth component view of the multi-wavelength laser illumination system, generally designated 90.

This multi-wavelength laser illumination system houses all of the system components, including the first, second and third pulsating laser emitting source 31, 41 & 42, the control unit 12, the control panel 13 the power supply 15 and at least one optical element 17 within a casing 91. The casing 91 has an open front 92, an open rear 93, a tail cap 94 to removably seal the open rear 93 and a transparent lens cover 95 over said open front 92.

Although the emissions of the laser emitting source 31, 41 & 42 are illustrated as being directed through a series of optical fibers 301, 302, 303 they feed to a fiber optic junction 43 which merges into a tertiary fiber optic cable 350 and then through at least one optical element 17, exiting the casing as the diffuse coherent visible light 210, 220, 230.

It is anticipated that one skilled in the art may add or remove fiber-optic fibers and such a modification does not depart from the intended scope of this invention.

Figure 10:
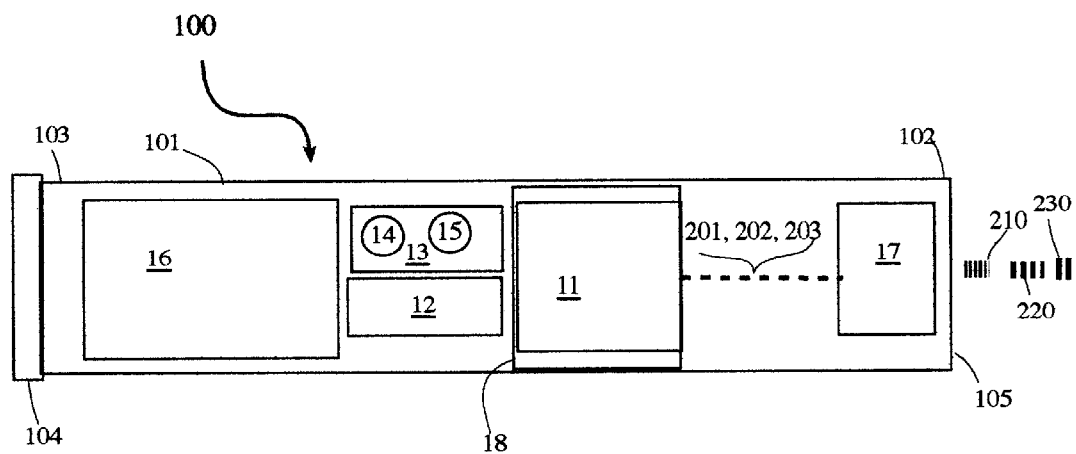
FIG. 10 illustrates a sixth component view of multi-wavelength laser illumination system.

Referring now to FIG. 10 there is shown a sixth component view of the multi-wavelength laser illumination system, generally designated 100.

This multi-wavelength laser illumination system houses all of the components, including a tunable laser emitting source 11, control unit 12, control panel 13 power supply 15 and at least one optical element 17 fixed within a casing 100.

The casing 101 has an open front 102, an open rear 103, a tail cap 104 to removably seal the open rear 103 and a transparent lens cover 105 to mount over said open front 102.

The controllably pulsed discreet wavelengths of coherent visible light 201, 202, 203 are directed through at least one optical element 17 and then through the transparent lens cover 105, exiting as the diffuse coherent visible light 210, 220, 230.

Figure 11:
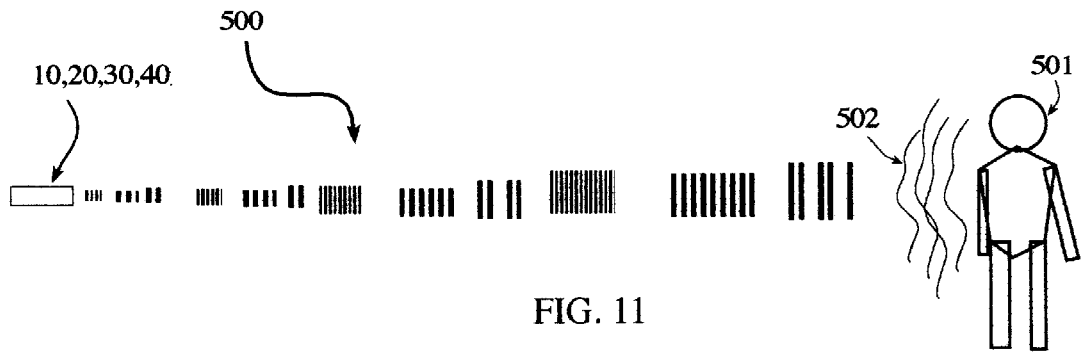
FIG. 11 illustrates the use and method of producing a laser spot light illumination.

Referring now to FIG. 11 there is illustrated the use and method of producing a laser spot light illumination, generally designated 500.

Laser emitting devices, such as those described in FIGS. 1–10 direct or aim the diffuse coherent visible light 210, 220, 230 at the target 501, and the diffuse coherent visible light 210, 220, 230 is both absorbed and reflected off the target and the sequentially overlaid diffuse coherent visible light 210, 220, 230 interferes and scatters, at the target 501 to form the illumination 502.

Since certain changes may be made in the above apparatus without departing from the scope of the invention herein involved, it is intended that all matter contained in the above description, as shown in the accompanying drawing, shall be interpreted in an illustrative, and not a limiting sense.

What is claimed is:

1. A method of producing a diffuse coherent illumination, comprising:
   (a) the first step of directing a pulse of diffuse coherent light of a first wavelength at a target;
   (b) the second step of directing a pulse of diffuse coherent light of a second wavelength at substantially the same location on the target that the first wavelength was directed at; and
   (c) sequentially repeating the pulsing of the diffuse coherent light, whereby the combination of light absorbed by the target and light reflected off the target produces an illumination.

2. The method of claim 1, wherein the sequential repetition of pulsing the diffuse coherent light occurs at a frequency beyond the visual threshold.

3. The method of claim 1, the method further comprising directing each pulse of diffuse coherent light through an additional diffusion element prior to reaching said target.

4. The method of claim 1, wherein the sequential repetition of pulsing the diffuse coherent light occurs at a frequency beneath the visual threshold.

5. The method of claim 1, the method further comprising the third step of directing a pulse of diffuse coherent light of a third wavelength at substantially the same location on the target that the first and second wavelengths were directed at.

6. A device for producing a diffuse coherent illumination, comprising:
   (a) a laser emitting means for producing one or more selectable laser outputs of pre-determined wavelengths;
   (b) one or more selectable laser outputs,
   (c) a means for diffusing the one or more selectable laser outputs, whereby each selectable laser output forms a diffuse laser output;
   (d) a means for aiming said one or more diffuse laser outputs at a target; and,
   (e) a switching means for controlling the frequency, intensity and duration of each of said one or more selectable laser outputs.

7. The device according to claim 6, wherein said switching means sequentially pulses each of said one or more diffuse laser outputs at a rate beyond the visual threshold.

8. The device according to claim 7, where said one or more diffuse laser outputs are single and selected from the group of wavelengths consisting of the visible red, visible blue, visible green, infrared, or ultraviolet.

9. The device according to claim 7, where said one or more diffuse laser outputs are dual and each is selected from the group of wavelengths consisting of the visible red, visible blue, visible green, infrared, or ultraviolet.

10. The device according to claim 7, where said one or more diffuse laser outputs output are triple and each is selected from the group of wavelengths consisting of the visible red, visible blue, visible green, infrared, or ultraviolet.

11. The device according to claim 6, wherein said switching means sequentially pulses each of said one or more diffuse laser outputs at a rate beneath the visual threshold.

12. The device according to claim 6, further comprising at least one additional optical means placed in front of each diffuse laser output whereby a pre-determined shape or consistency of the diffuse laser output results.

13. The device according to claim 6, where said laser output aiming means is a handheld casing, containing at least the means for diffusing the one or more selectable laser outputs, which is connected to said laser emitting means via one or more fiber optic pathways.

14. The device according to claim 6, wherein the device is a size and shape to be easily hand carried.

15. The device according to claim 6, wherein the device is a size and shape to be easily carried back.

16. The device according to claim 6, wherein the device is mounted to a vehicle, ship or aircraft.

17. The device according to claim 6 wherein each laser emitting means is selected from the group consisting of He-Cd, Krypton, Argon, Nd:YAG, Nd;YVO, Nd:YLF, Diode-pumped, CW diode,Q-switched diode, solid-state, solid-state CW, solid-state Q-switched, gas, dye, organic, ion, and rare-earth element lasers.

18. The device according to claim 6 wherein the means for diffusing the one or more selectable laser outputs is selected from the group consisting of light shaping diffusers, beam homogenizers, beam diffusing elements, beam expanding elements, thin films, mirrors, a lens, or a combination of lenses.

19. A laser illumination system comprising:
   at least one laser emitting source;
   at least one laser output, each of a different wavelength;
   an optical element which diffuses each laser output prior to each the laser output reaching a target; at least one electronic switch to control the intensity of each laser output; and, a power supply connected to at least one laser source and the electronic switch.

* * * * *